(No Model.)
M. SPAULDING.
CORN SHOCK BINDER.
No. 386,361. Patented July 17, 1888.
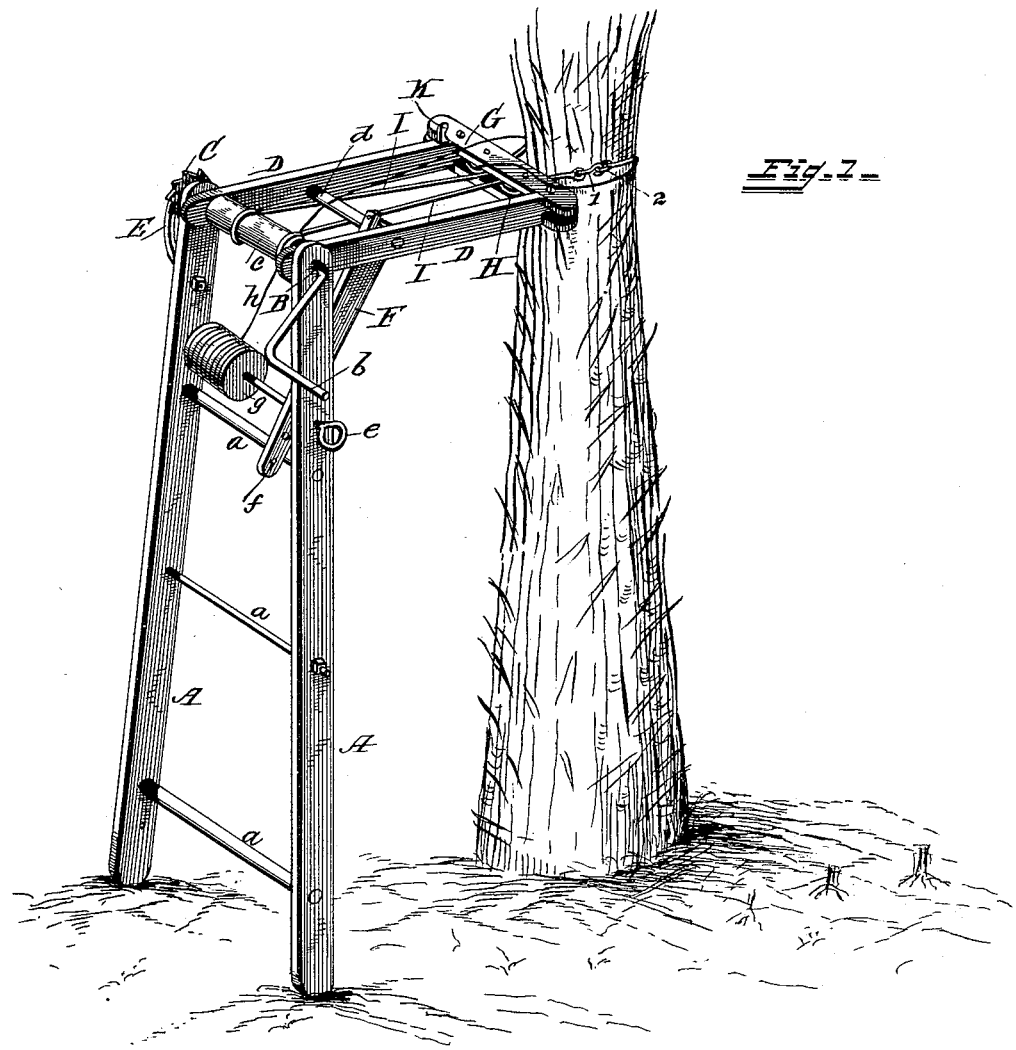
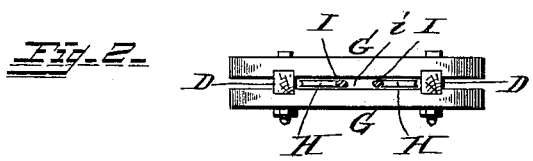
Witnesses.
Albert Speiden
E. H. Bond.
Inventor.
Mont Spaulding,
By his Attorney.
Chas. H. Fowler

UNITED STATES PATENT OFFICE.

MONT SPAULDING, OF ORLEANS, MICHIGAN.

CORN-SHOCK BINDER.

SPECIFICATION forming part of Letters Patent No. 386,361, dated July 17, 1888.

Application filed February 9, 1888. Serial No. 263,511. (No model.)

*To all whom it may concern:*

Be it known that I, MONT SPAULDING, a citizen of the United States, residing at Orleans, in the county of Ionia and State of Michigan, have invented certain new and useful Improvements in Corn-Shock Binders; and I do hereby declare that the following is a full, clear, and exact description of the same, reference being had to the annexed drawings, making a part of this specification, and to the letters and figures of reference marked thereon.

This invention relates to certain new and useful improvements in corn-shock binders; and the novelty resides in the peculiar combinations and the construction, arrangement, and adaptation of parts, all as more fully hereinafter described, shown in the drawings, and then particularly pointed out in the claims.

In the accompanying drawings, which form a part of this specification, Figure 1 is a perspective view of a device embodying my improvement and its adaptation. Fig. 2 is an end view of the horizontal arm, which will be more particularly hereinafter referred to.

Referring now to the details of the drawings by letter, A designates suitable bars or rails held at a regulated distance apart by the rods $a$, and preferably somewhat spread at the bottom in order to the better enable the same to stand. In the upper ends of these bars is journaled a shaft, B, one end of which carries a ratchet-wheel, C, and the other end is provided with a crank, $b$. This shaft forms a pivot upon which the arms D turn, and fast upon this shaft is mounted axially the cylinder $c$.

E is a dog pivoted on one of the bars A and adapted to engage the ratchet C on the shaft B. Between their ends the arms or bars D are connected by the cross-bar $d$, upon which is pivoted one end of the brace-bar F, the other end of which is provided with a plurality of holes, $f$, with one or the other of which the pin $e$ is designed to engage, which pin passes through holes in the bars A and forms a bearing for the spool $g$, carrying the binding twine or cord $h$. The outer ends of the bars D are connected by the cross-bars G with a space, $i$, between them and in which are journaled the pulleys H.

I are compressing cords or ropes, one end of each of which is secured to the cylinder $c$, and the other ends pass through the space $i$ between the cross-bars G and over the pulleys H, as shown, and the free end of one of said cords being provided with a hook, 1, and the other with an eye, 2, or a knot or some other provision for engaging said hook.

K is a knife or a cutting-blade secured to one of the arms D or cross-bars G, and upon which the binding-twine is designed to be cut.

The operation is apparent. With the parts in the position shown in Fig. 1, the free ends of the cords I are put around the bundle or shock of corn and united by engaging the hook and eye, as shown. The crank $b$ is then turned until the bundle is compressed against the cross-bars G, the cords I being wound upon the cylinder $c$ and held from retrograde movement by means of the ratchet and pawl. When the bundle has been sufficiently compressed, it is tied by hand by means of the twine $h$, which is then cut upon the knife K. The dog is then released from engagement with the ratchet and the compressing-cords I unwound from the cylinder $c$, when the compressing-cords can be unhooked and the bundle readily removed. When in use, the adjustability provided by the pin $e$ and the holes in the brace-bar F permits of the use of the device for binding corn of different heights, and when not in use the device can be folded up, so as to occupy but little space.

What I claim as new is—

1. The combination, with the supporting-bars A and the arms D, of the shaft B, pivotally connecting said bars and arms, and the bars G, connecting the outer ends of said arms, cylinder $c$ on said shaft, the cords I, formed with hook and eye and secured at one end to said cylinder and the other ends adapted to engage the shocks, and the inclined bar F, pivoted at one end to the arms D and at its other end provided with a plurality of holes, by which it is adjustably secured to the bars A by a pin, substantially as and for the purpose specified.

2. The combination, with the supporting-bars A, and arms D, pivotally connected thereto and carrying the compressing mechanism, the crank, and the bars G on the outer ends of the arms D, of the brace-bar F, pivotally connected at one end with the arms D and at the other end provided with a plurality of holes, $f$, and the pin *e*, connecting said brace-bar with the bars A and forming a support for the spool *g*, substantially as described.

3. The combination, with the supporting-bars A, the arms D, and the shaft B, pivotally connecting said bars and arms, provided with a crank, of the cylinder *c* on said shaft, the cross-bars G, connecting the outer ends of said arms, the pulleys H, journaled between said cross-bars, the cords I, secured at one end to said cylinder and the other ends passed over said pulleys, and the knife K on one of said arms, all substantially as and for the purpose specified.

In testimony that I claim the above I have hereunto subscribed my name in the presence of two witnesses.

MONT SPAULDING.

Witnesses:
JOHN MORTON,
CHARLES LEACH.